United States Patent
Kamyshev et al.

(10) Patent No.: US 12,140,565 B2
(45) Date of Patent: Nov. 12, 2024

(54) METHOD FOR CALCULATING RESIDUAL STRESSES IN THE SEAM METAL OF WELDED PIPELINE JOINTS (VARIANTS)

(71) Applicants: JOINT STOCK COMPANY "ROSENERGOATOM", Moscow (RU); LLC "INKOTES", Nizhnii Novgorod (RU); JOINT-STOCK COMPANY "ALL-RUSSIAN INSTITUTE FOR NUCLEAR POWER PLANTS OPERATION", Moscow (RU); SCIENCE AND INNOVATIONS—NUCLEAR INDUSTRY SCIENTIFIC DEVELOPMENT, PRIVATE ENTERPRISE, Moscow (RU)

(72) Inventors: Arkadiy Vadimovich Kamyshev, Nizhnii Novgorod (RU); Lev Abramovich Pasmanik, Nizhnii Novgorod (RU);

(Continued)

(73) Assignees: JOINT STOCK COMPANY "ROSENERGOATOM", Moscow (RU); LLC "INKOTES", Nizhnii Novgorod (RU); JOINT-STOCK COMPANY "ALL-RUSSIAN INSTITUTE FOR NUCLEAR POWER PLANTS OPERATION" (VNIIAES), Moscow (RU); SCIENCE AND INNOVATIONS—NUCLEAR INDUSTRY SCIENTIFIC DEVELOPMENT, PRIVATE ENTERPRISE, Moscow (RU)

( * ) Notice: Subject to any disclaimer, the term of this patent is extended or adjusted under 35 U.S.C. 154(b) by 285 days.

(21) Appl. No.: 17/257,278

(22) PCT Filed: Dec. 23, 2019

(86) PCT No.: PCT/RU2019/001052
§ 371 (c)(1),
(2) Date: Dec. 30, 2020

(87) PCT Pub. No.: WO2020/204751
PCT Pub. Date: Oct. 8, 2020

(65) Prior Publication Data
US 2022/0018812 A1  Jan. 20, 2022

(30) Foreign Application Priority Data

Apr. 5, 2019  (RU) .......................... RU2019110165

(51) Int. Cl.
*G01N 29/07* (2006.01)
(52) U.S. Cl.
CPC ....... *G01N 29/07* (2013.01); *G01N 2291/011* (2013.01); *G01N 2291/02827* (2013.01); *G01N 2291/0422* (2013.01)
(58) Field of Classification Search
CPC ......... G01N 29/07; G01N 2291/02827; G01N 2291/0422
See application file for complete search history.

(56) References Cited

U.S. PATENT DOCUMENTS

| 2010/0272849 | A1* | 10/2010 | Kaushal | .................. B29C 45/74 425/547 |
| 2016/0084802 | A1* | 3/2016 | Yusuf | .................. G01N 29/4436 73/582 |
| 2018/0229289 | A1* | 8/2018 | Moore | .................... B21B 19/06 |

FOREIGN PATENT DOCUMENTS

| CN | 103017944 A | * | 4/2013 | |
| CN | 106326667 B | * | 2/2019 | ............. G06F 19/00 |

(Continued)

OTHER PUBLICATIONS

Machine translation of RU2598980C2 (Year: 2016).*
(Continued)

*Primary Examiner* — Alexander Satanovsky
*Assistant Examiner* — Sangkyung Lee
(74) *Attorney, Agent, or Firm* — J. Miguel Hernandez; James R. Gourley; Carstens, Allen & Gourley, LLP

(57) ABSTRACT

Methods for non-destructive testing of engineering materials. In one aspect, a method can be used to calculate residual
(Continued)

longitudinal and annular welding stresses in welded joints and can be used to assess the quality of pipeline welds according to the criterion of the level of residual stresses and to determine the initial parameters for the pipeline strength calculation. In some aspects, the method enables independent calculation of the longitudinal and hoop residual stresses. Thus, the stresses can be calculated in the seam metal of the pipelines welds, where they reach their maximum values. The method can be used to test a pipeline section using an ultrasonic echo method to measure the propagation time for longitudinal waves and transverse waves polarized along and across the pipe axis. The measurement results define the distinguishing features of the stress state of a welded joint for a specific type of pipe by numerical modeling.

1 Claim, 6 Drawing Sheets

(72) Inventors: Viktor Donatovich Rovinskiy, Nizhniy Novgorod (RU); Aleksandr Fedorovich Getman, Moscow (RU); Sergei Valer'evich Guba, Moscow (RU)

(56) References Cited

FOREIGN PATENT DOCUMENTS

| JP | 4142246 B2 | * | 9/2008 | ........... B60R 21/013 |
| JP | 4419802 B2 | * | 2/2010 | |
| KR | 101011844 B1 | * | 1/2011 | |
| RU | 2598980 C2 | * | 10/2016 | |

OTHER PUBLICATIONS

Machine translation of JP4419802B2 (Year: 2010).*
Machine translation of JP 4142246B2 (Year: 2008).*
Machine translation of CN103017944A (Year: 2013).*
Machine translation of CN106326667B (Year: 2019).*
Generalized Coefficients for Measuring Mechanical Stresses in Carbon and Low-Alloyed Steels by the Acoustoelasticity Method, Russian Journal of Nondestructive testing vol. 53, No. 1 (Year: 2017).*
Machine translation of KR101011844B1 (Year: 2011).*

* cited by examiner

METHOD FOR CALCULATING RESIDUAL STRESSES IN THE SEAM METAL OF WELDED PIPELINE JOINTS (VARIANTS)

CROSS-REFERENCE TO RELATED DISCLOSURE

This application is a U.S. National Stage of International Application No. PCT/RU2019/001052, filed on Dec. 23, 2019, and published as WO 2020/204751 on Oct. 8, 2020, titled "Method for Calculating Residual Stresses in the Seam Metal of Welded Pipeline Joints (Variants)," which claims priority to RU 2019110165 filed on Apr. 5, 2019. Each application, publication, and patent listed in this paragraph are hereby incorporated by reference in their entireties.

The group of inventions relates to non-destructive testing of engineering materials. It can be used for the residual longitudinal and annular welding stresses calculation in the welded joints and can be used to assess the quality of pipeline welds according to the criterion of the level of residual stresses and to determine the initial parameters for the pipeline strength calculation.

The method for calculating stresses in the seam metal by the mechanical method of a probing hole, based on the elastic unloading principal [1] is already known. The conventional method consists in a procedure for evaluating biaxial surface stresses based on the results of measuring the deformation response by means of the digital speckle interferometry. The deformation response is identified by the results of drilling a non-through hole on the surface of the seam metal. The possibility of the calculation of residual stresses directly in the seam metal coincides with the essential features of the claimed invention.

The drawback of the conventional method lies in that it is necessary to violate the integrity of the controlled product for its implementation, that is, it is a destructive control method.

This drawback is due to the fact that the use of the destructive methods is unacceptable when controlling production welded joints.

The set of features closest to the set of essential features of the claimed invention is inherent in the well-known ultrasonic method for the calculation of residual stresses in the pipelines welds.

The closest engineering solution is known from the utility patent [2]. The conventional method (prototype) comprises a procedure for measuring the ultrasonic echo method of the propagation times (delays) of the longitudinal waves and transverse waves polarized along and across the pipe axis, from the values of which the stress state characteristics are calculated at the control points. The method allows calculating the value of the difference between the longitudinal and the residual hoop stresses in the pipeline sections adjacent to the welded joint as the product of the proportionality coefficient and the value of the correlation parameter between the Poisson's coefficients at the measurement point. The possibility of calculation the residual membrane stresses characteristics in the base metal of the welded joints by ultrasound coincides with the essential features of the claimed invention.

However, in the conventional method adopted for the prototype, the distinguishing features of the stress state are calculated only in the area of the base metal adjacent to the welded joint, and also that the only defined feature of the stress state is the difference between the membrane hoop and longitudinal stresses.

The specified drawbacks are due to the fact that the results obtained by the conventional method, on the one hand, might not be used to assess the quality of the welded joints and for strength calculations, since it is necessary to use separate values of longitudinal and hoop stresses, but not their difference. On the other hand, in the area of the base metal adjacent to the weld joint, where measurements are performed, the residual stresses are significantly less than in the seam metal [3], while for strength calculations it is necessary to use the maximum values of the residual stresses.

The conventional method does not allow obtaining the values of the residual stresses in the seam metal—the maximum values of longitudinal and hoop residual stresses in the welded joints.

This limitation is due to the fact that the conventional method includes a calibration procedure that can only be performed in areas devoid of the residual stresses. Since the elastic wave propagation velocities depend on both the stress and the metal structural features, calibration can only be performed where the metal structure is identical to the metal at the measurement points. As the structure of the seam metal differs from the structure of the base metal, it is unacceptable to use the calibration results on the base metal to assess the stresses in the weld metal. At the same time, it is impossible to perform calibration in the seam metal, since it is impossible to distinguish the area where there are guaranteed to be no residual welding membrane stresses. This makes it impossible to apply the conventional method for measuring stresses directly in the seam metal.

In addition, the conventional method does not allow educing the independent values of longitudinal and hoop membrane stresses from the measured stress state features.

The object to be solved by the claimed group of inventions is to assess the actual state of the pipelines welds during installation, repair and operation based on the results of non-destructive testing of the stress state.

The technical result of the claimed group of inventions is to provide the possibility of independent calculation of the longitudinal and hoop residual stresses. Thus, the stresses are calculated in the seam metal of the pipelines welds, where they reach their maximum values.

The technical result of the invention according to the first embodiment is provided in that in the method of the calculation of residual stresses in the weld metal of pipelines welds, consisting in that on the pipeline section under tests the propagation time for longitudinal waves and transverse waves polarized along and across the pipe axis are measured with the ultrasonic echo method, and the measurement results define the distinguishing features of the stress state of a welded joint according to the claimed solution for a specific type of pipe by numerical modeling to pre-define the position of the cross-sections balancing, which balancing the hoop stresses in the base metal reaches the minimum value, and the balancing coefficient value, equal to the ratio of the maximum membrane residual tensile hoop stresses in the seam metal to the value of the minimum residual compressive membrane hoop stresses in the base metal. Further, prior to the welded joints completion, measurements of the initial values of the propagation time of the longitudinal wave and transverse waves polarized along and across the pipe axis are performed in the balancing sections are performed; after the welded joints completion at the same measurement points, measurements of the performance values of the propagation time of the same types of waves are performed, according to the results of measurements applying the acoustoelasticity equations for a biaxial stress state:

$$\sigma_z = K_1\left(\frac{t_{01}t_3}{t_1 t_{03}} - 1\right) - K_2\left(\frac{t_{02}t_3}{t_2 t_{03}} - 1\right)$$

$$\sigma_t = K_1\left(\frac{t_{01}t_2}{t_1 t_{02}} - 1\right) - K_2\left(\frac{t_{01}t_3}{t_1 t_{03}} - 1\right)$$

where $t_{01}$, $t_{02}$, $t_{03}$ are the initial and $t_1$, $t_2$, $t_3$ are the performance values of the propagation times of the transverse waves polarized along and across the generating line of a tube and longitudinal wave, respectively, $K_1$ and $K_2$ are the coefficients of the acoustic-elastic linkage, for each section of measurements, the values of membrane longitudinal and hoop stresses are calculated, as well as bending moments, using which, based on the principle of balancing membrane stresses and taking into account the balancing coefficient, the maximum values of residual longitudinal and hoop local stresses in the seam metal are calculated.

The technical result of the invention according to the second embodiment is provided in that in the method of the calculation of residual stresses in the weld metal of pipelines welds made of the acoustically isotropic metal, consisting in that on the pipeline section under tests the propagation time for the bulk waves are measured with the ultrasonic echo method, and the measurement results define the distinguishing features of the stress state of a welded joint according to the claimed solution for a specific type of pipe by numerical modeling to pre-define the position of the cross-sections balancing, which balancing the hoop stresses in the base metal reaches the minimum value, and the balancing coefficient value, equal to the ratio of the maximum membrane tensile hoop stresses in the seam metal to the value of the minimum compressive membrane hoop stresses in the base metal and also the value of the intrinsic acoustic anisotropy of the base metal. After the welded joint completion, in the balancing sections, measurements of the performance values of the propagation time of transverse waves polarized along and across the pipe axis are performed, according to the results of measurements using the acoustoelasticity equation for the difference between the longitudinal and hoop membrane stresses the specified difference for each measuring point is calculated:

$$\sigma_z - \sigma_t = D\left(200\frac{t_2 - t_1}{t_2 + t_1} - a_0\right)$$

where, $a_0$ is the intrinsic acoustic anisotropy of the base metal, D is the elastic-acoustic coupling coefficient, the separation of longitudinal and hoop membrane stresses is performed using the results of defining the longitudinal stresses in the additional section, then for each measurement section, the values of membrane longitudinal and hoop stresses are calculated, as well as bending moments, using which, based on the principle of balancing membrane stresses and taking into account the balancing coefficient, the maximum values of residual longitudinal and hoop local stresses in the seam metal are calculated.

The claimed group of inventions is explained by graphic materials, where

Figure 5:
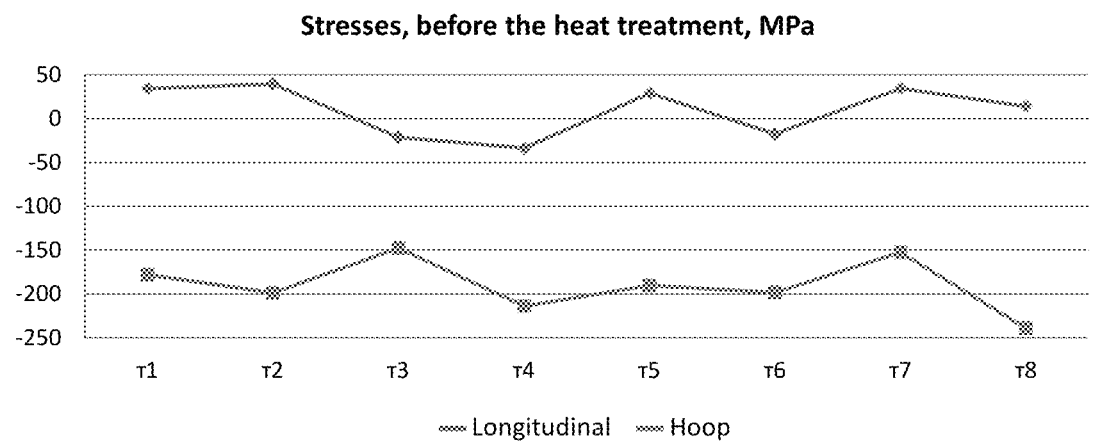
Figure 6:
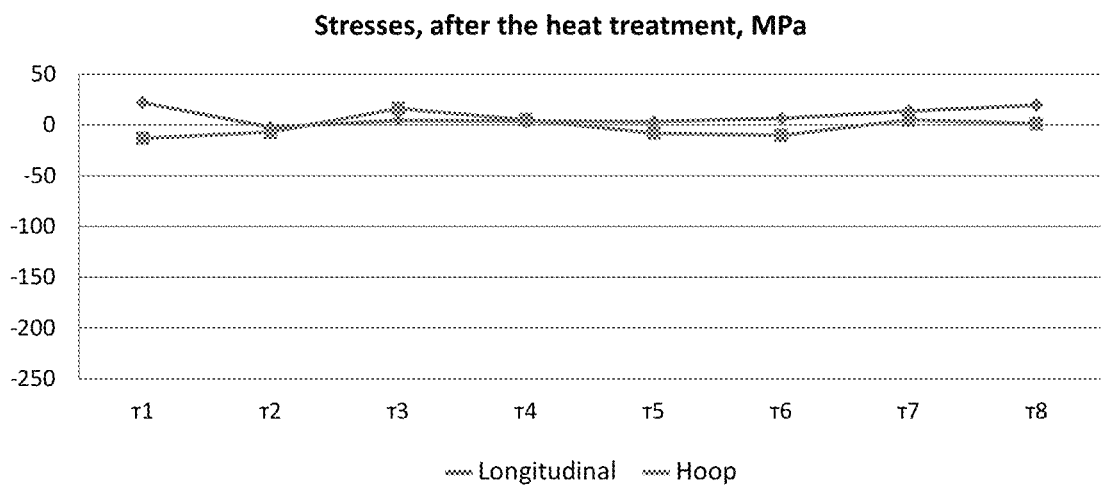
Figure 7:
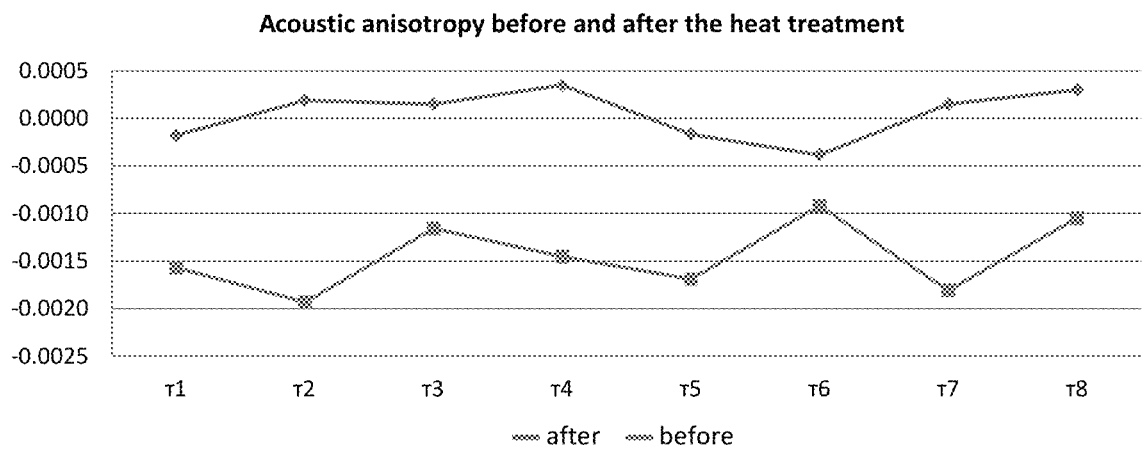

FIGS. 5 and 6 graphically show the results of the defining longitudinal and hoop stresses at the measurement points before and followed by heat treatment of the specimens, FIG. 7 shows the results of measurements of acoustic anisotropy values before and followed by the heat treatment (averaged over the measurement cross sections).

The method comprising a procedure for measuring the propagation times of a longitudinal wave and transverse waves polarized along and across the pipe axis, as well as defining the features of the stress state of a welded joint in the base metal, as per the invention additionally contains the following operations: measurements are performed in certain areas of the base metal adjacent to the seam metal. These areas correspond to the regions of localization of the minimum compressive hoop membrane residual stresses, which balance the maximum tensile hoop membrane residual stresses in the seam metal. The balancing effect that occurs specifically for membrane stresses provides a one-to-one correlation between hoop membrane residual stresses in the weld metal and in the adjacent to-the-weld area. This allows calculating the ratio between them—the balancing coefficient, which is used to calculate the maximum residual stresses in the seam metal based on the results of measurements in the adjacent to-the-weld area.

The measurements are made in the cross sections of the pipeline located in the specified areas. The position of these sections, as well as the value of the balancing coefficient is defined by the results of preliminary studies or calculations. According to the results of measuring the propagation times of elastic waves before and followed by the welded joint completion by the acoustoelastic method, the values of longitudinal and hoop membrane stresses in the measurement cross sections are obtained.

The maximum values of longitudinal and hoop local residual stresses in the seam metal are defined from the obtained values of stresses in the measurement cross sections based on the balancing membrane stresses principal using the balancing coefficient.

In a particular case, when measurements are made on pipelines made of acoustically isotropic materials, the measurement of elastic wave propagation times made prior the welded joint completion is excluded, which makes it possible to evaluate residual stresses not only during assembly, but also on pipelines in operation. The values of longitudinal and hoop membrane stresses in the measurement sections are determined only by the results of measurements performed after the welded joint is made. The distinguishing feature of this procedure is the use of stress measurement results in an additional cross-section located outside the residual stress localization area.

The method for the embodiment according to the first option is carried out as follows.

In the method for the calculation of residual stresses in the seam metal of pipelines welds, which consists in the fact that the propagation time of the longitudinal wave and transverse waves polarized along and across the pipe axis is measured using the ultrasonic echo method, and the measurement results define the features of the stress state of the welded joint for a specific type of pipe, the position of the balancing sections is pre-defined by computational modeling. The balancing hoop stresses in the base metal reach minimum values in the specified cross sections. The position of the cross sections is defined by the results of computational modeling of the residual welding stresses or by the results of experimental studies on control welded joints performed after welding but before the heat treatment. Studies are performed for each type of welded joint, which is characterized by the diameter, the pipe wall thickness and the welding technology.

Also, based on the results of calculated or experimental studies, the balancing coefficient (k), which is equal to the ratio of the maximum tensile membrane hoop stresses in the seam metal ($\sigma_{tmax}$) to the value of the minimum compressive membrane hoop stresses ($\sigma_{tmin}$) in the base metal, is defined. The value of k is defined by the results of computational modeling of the residual welding stresses according to the formula:

$$k = \frac{\sigma_{tmax}}{\sigma_{tmin}} \quad (1)$$

It is required to precisely apply the acoustoelasticity method for the measurements, which includes the echo method of ultrasonic testing, as the only non-destructive method that provides measurement of the membrane rather than surface stresses [4].

The measurements shall be performed by devices that implement the measurement method and are certified as instrumentation for single- and bi-axial mechanical stresses.

Prior the start of the welded joint completion, the initial values of the propagation time of the longitudinal wave and transverse waves polarized along and across the pipe axis are measured in the balancing sections.

After the welded joint completion, the performance values of the propagation time of the same types of waves are measured at the same measurement points. After that, based on the results of the measurements using the acoustoelasticity equations for the biaxial stress state:

$$\sigma_z = K_1\left(\frac{t_{01}t_3}{t_1 t_{03}} - 1\right) - K_2\left(\frac{t_{02}t_3}{t_2 t_{03}} - 1\right) \quad (2)$$

$$\sigma_t = K_1\left(\frac{t_{01}t_2}{t_1 t_{02}} - 1\right) - K_2\left(\frac{t_{01}t_3}{t_1 t_{03}} - 1\right) \quad (3)$$

where $t_{01}$, $t_{02}$, $t_{03}$ are the initial values, and $t_1$, $t_2$, $t_3$ are the performance values of the propagation times of transverse waves polarized along and across the generating line of a tube and the longitudinal wave, respectively.

$K_1$ and $K_2$ are the elastic-acoustic coupling coefficients calculated in accordance with the standard procedure provided for [5] (for welded elements made of carbon and low-alloy steels, it is allowed not to define the values of $K_1$ and $K_2$, but to apply the generalized elastic-acoustic coupling coefficients [6]).

Based on the results of measurements of time delays according to formulas (2) and (3), the values of longitudinal and hoop stresses at the measurement points are calculated for each section of measurements:
 hoop membrane balancing stresses averaged over the measurement cross section ($\overline{\sigma_t}$);
 longitudinal membrane stresses averaged over the measurement cross section ($\overline{\sigma_z}$);
 total bending moment according to the formula:

$$M = \sqrt{\overrightarrow{M_x}^2 + \overrightarrow{M_y}^2} \quad (4)$$

where $M_{M,x}$ и $M_{M,y}$ are the components of the moment in Cartesian axials taken for the subject of the survey, calculated using the formulas [7]

$$M_x = \frac{W}{x}\int_0^{2\pi} \sigma_z(\theta)\sin(\theta)d\theta \quad (5)$$

$$M_y = -\frac{W}{x}\int_0^{2\pi} \sigma_z(\theta)\cos(\theta)d\theta \quad (6)$$

$$W = \frac{\pi(D_{in}+h)^2 h}{4},$$

where W is the resistance moment of a thin-walled pipe; h is the wall thickness of the pipe; $D_{in}$ is the inner diameter of the pipe; θ is the angular coordinate in the cross-sectional plane, the function of the angular distribution of longitudinal stresses $\sigma_z(\theta)$ is defined by the results of measurements of the values of longitudinal stresses at the measurement points.

Where the measurements are performed in both sections located on both sides of the seam, the values $\overline{\sigma z}$, $\overline{\sigma_t}$ and M averaged over both sections are used to define the stresses in the seam metal.

The maximum hoop tensile stresses in the deposited metal are determined by the value of the minimum balancing hoop membrane stresses in the area of the base metal adjacent to the welded joint. The maximum values of hoop residual stresses in the seam metal ($\sigma_{t,s}$) using the balancing coefficient are calculated according to the formula:

$$\sigma_{t,s} = k\overline{\sigma_t} \quad (7)$$

The maximum longitudinal stresses are defined as a superposition of stresses due to tension and bending stresses due to the total bending moment. The maximum values of longitudinal stresses in the seam metal ($\sigma_{z,s}$) calculated according to the formula:

$$\sigma_{z,s} = \frac{M}{W} + \overline{\sigma_z} \quad (8)$$

Where the results of studies on base metal of the welded components representative specimens define that it is acoustically isotropic, that is, the variation of intrinsic acoustic anisotropy of the basic metal ($a_0$), defined according to the $$a_0 = 2\frac{t_{02} - t_{01}}{t_{02} + t_{01}}, \quad (9)$$

does not exceed 0.0004, then the second variant of the method for defining residual stresses is implemented.

The method for the embodiment according to the second option is carried out as follows.

On the pipeline section under study, the bulk waves propagation time is measured applying the ultrasonic echo method, and the features of the stress state of the welded joint are defined based on the measurement results. According to the second option of the method for defining the residual stresses in the pipelines welds metal made of acoustically isotropic metal, for the specific pipes type, pre-determined by the computational modeling:
 the position of the balancing sections in which the balancing hoop stresses in the base metal reach the minimum values;
 the value of the balancing coefficient (k) according to the formula (1).

The value of the intrinsic acoustic anisotropy of the base metal ($a_0$) is also defined.

The position of the balancing sections should be specified after the weld is made during preliminary measurements performed at points located along the generating lines of a pipeline.

After the welded joint completion, the performance values of the propagation time of the transverse waves polarized along and across the pipe axis are measured in the balancing sections. Based on the results of measurements using the acoustoelasticity equation for the difference between longitudinal and hoop membrane stresses, the values of the specified difference are determined for each measurement point:

$$\sigma_z - \sigma_t = D\left(2\frac{t_2 - t_1}{t_2 + t_1} - a_0\right) \quad (10)$$

where D is the elastic-acoustic coupling coefficient for the uniaxial stress state, defined in accordance with the standard procedure provided for [5] (for welded components made of carbon and low-alloy steels, it is allowed not to define the values of D, but to use the generalized elastic-acoustic coupling coefficient [6]).

Separation of the longitudinal and hoop membrane stresses is performed using the results of defining the longitudinal stresses in the additional section. Therefor, based on the results of measurements in the additional section located outside the area of residual welding stresses, $\overline{\sigma}_z$—the average values of longitudinal membrane stresses ($\sigma_z$) at the measurement points are calculated. The values $\sigma_z$, therefore, are calculated according to the formula (10), provided that there are no residual stresses in the cross section of additional measurements and, consequently, at all measurement points $\sigma_t = 0$.

The values of the membrane hoop stresses are defined in accordance with the compensation principle for bending longitudinal stresses in the cross section, and also taking into account the fact that the average values of the longitudinal membrane stresses are the same along the entire length of the cylindrical component. For each measurement cross-section, the values of $\overline{\sigma}_t$—the average values of the hoop membrane balancing stresses ($\sigma_t$) over the measurement cross-section. The hoop membrane stresses at the measurement points, in accordance with (10), are calculated according to the formula:

$$\sigma_t = \overline{\sigma}_z - D\left(2\frac{t_2 - t_1}{t_2 + t_1} - a_0\right). \quad (11)$$

The total bending moment M and its components $M_x$ and $M_y$ are calculated according to the formulas (4, 5 and 6), respectively.

Where the measurements are performed in both sections located on both sides of the seam, the values $\overline{\sigma}_z$, $\overline{\sigma}_t$ and M averaged over both sections are used to define the stresses in the seam metal.

The maximum values of residual longitudinal and hoop local stresses in the seam metal $\sigma_{t,s}$ and $\sigma_{z,s}$ are calculated according to the formulas (7) and (8) c applying the balancing coefficient.

The claimed group of inventions is explained by the following examples.

Example 1. Calculation of the maximum residual welding stresses in the welded joint of a split-design coil made of pipe billets DN850x70 (steel 10GN2MFA).

Acoustoelasticity parameters were measured using the IN-5101A device, certified as a instrument for single- and bi-axial mechanical stresses. The measurements were performed in accordance with the requirements of [5].

The position of cross sections for the pipes type and the value of the balancing coefficient were defined based on the results of the computational modeling of the residual welding stresses prior the heat treatment using the "SVARKA" software package developed at the Technologies of Welding and Diagnostics Department of Bauman Moscow State Technical University.

Figure 1:
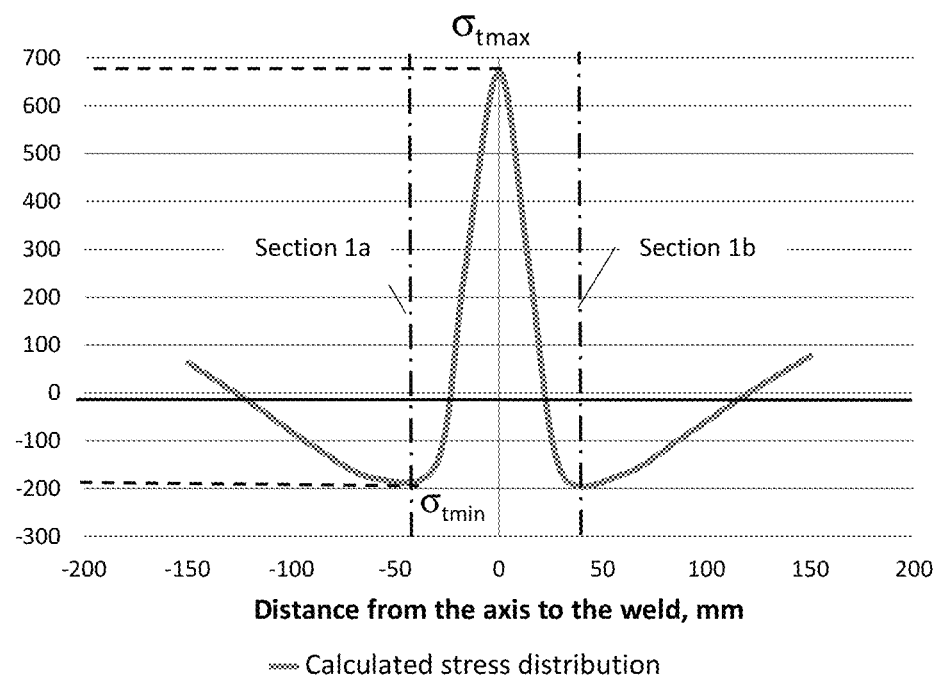
FIG. 1 shows a graphic chart of the calculated stress distribution.

FIG. 1 shows the diagram for defining the measurement cross sections (1A and 1B) based on the results of calculations of hoop membrane stresses in a welded joint by the finite element technique.

According to the calculation results (FIG. 1), it is found that the measurement sections 1A and 1B are located at a distance of ±50 mm from the weld central axis, and the balancing coefficient according to the formula (1): k=−3.25.

Figure 2:
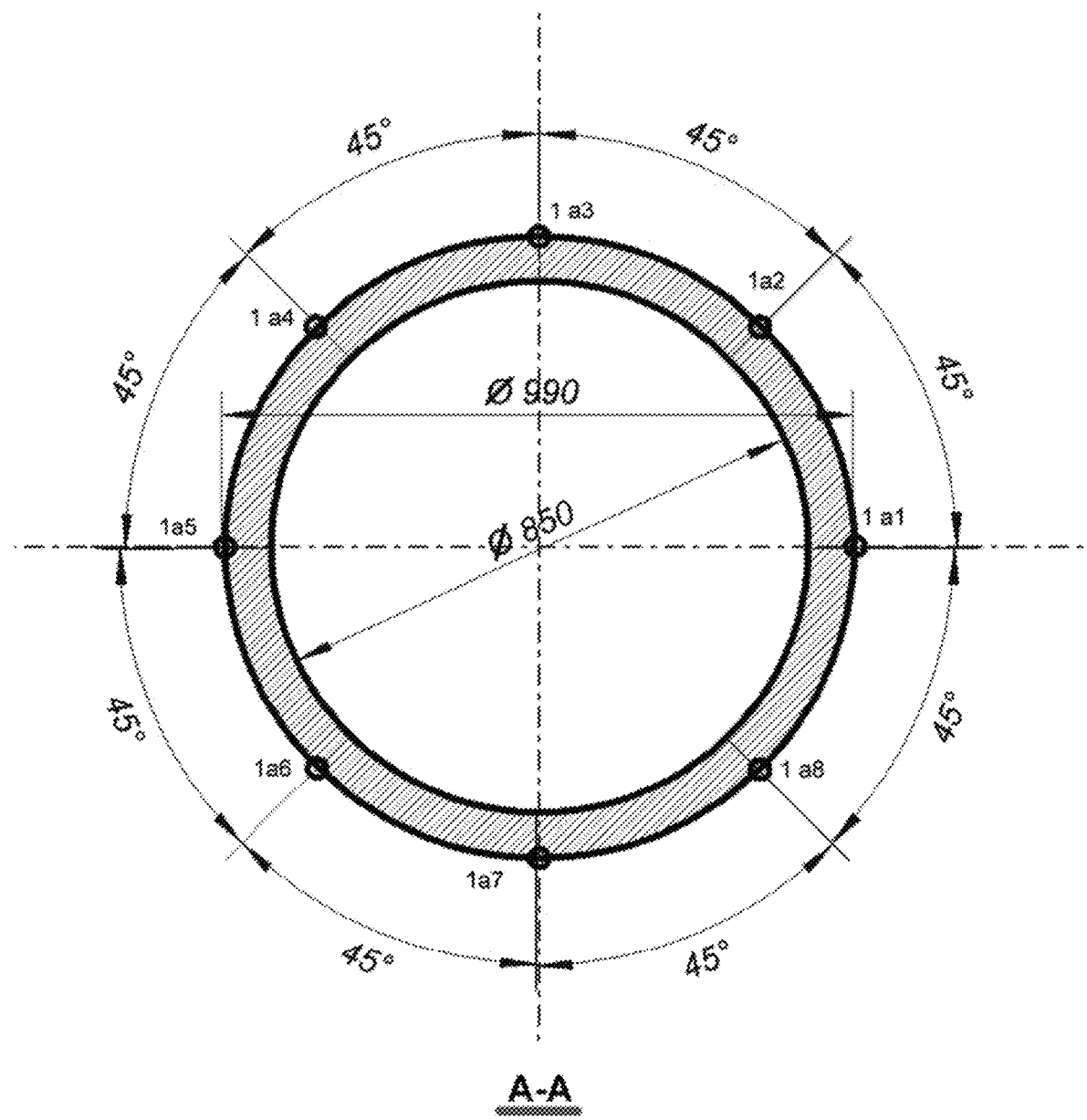
FIGS. 2 and 3 show the layout of the measurement points.
Figure 3:
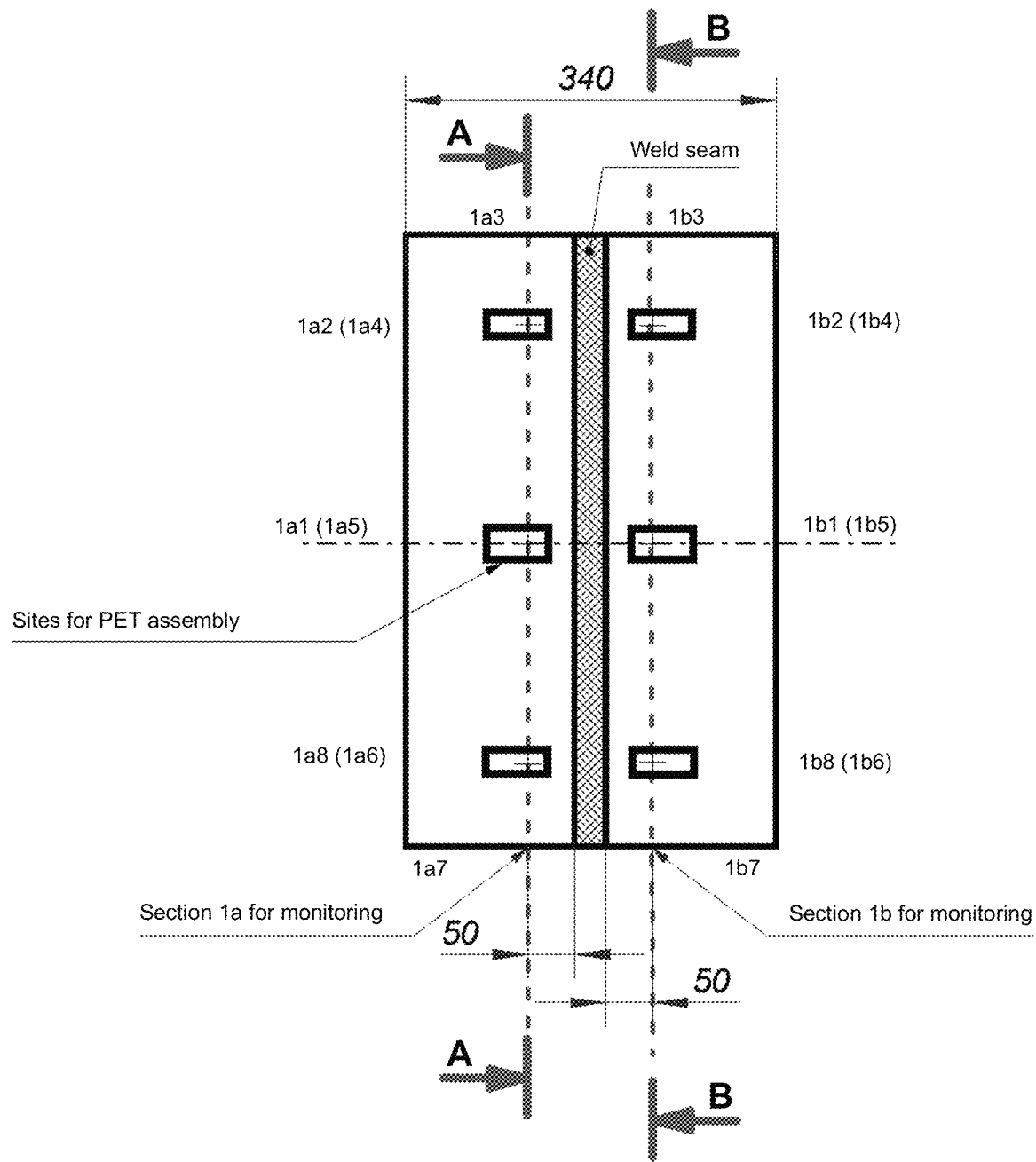

Further, the measurement points were indicated. The measurement points layout on the monitored object in sections 1A and 1B is shown on FIGS. 2 and 3.

The initial values of the propagation times ($t_{01}$, $t_{02}$, $t_{03}$) of acoustic signals were calculated at all measurement points prior to welding.

The performance values ($t_1$, $t_2$, $t_3$) were defined twice: prior and followed by the heat treatment. The results of defining the cross-section averaged measurements applying formulas (2) and (3) of longitudinal and hoop stresses at the measurement points prior (curve a) and followed by (curve b) the heat treatment are shown on FIG. 4.

To calculate the stresses, the elastic-acoustic coupling coefficients obtained in accordance with the requirements of [5] for 10GN2MFA steel were applied:

$K_1$=−116300 MPa; $K_2$=−12000 MPa; $D$=−128300 MPa.

Based on the results of the stress measurement, the following parameters are defined:
the averaged values of hoop stresses in the measurement cross sections prior and followed by the heat treatment ($\overline{\sigma}_{t,wld}$ and $\overline{\sigma}_{t,HT}$, respectively):

$\overline{\sigma}_{t,wld}$=−190 MPa; $\overline{\sigma}_{t,HT}$=−1 MPa;

according to the formulas (4-6), the values of the bending moment in the weld section prior and followed by the heat treatment ($M_{wld}$ and $M_{HT}$, respectively):

$M_{wld}$=0.14 mN*m; $M_{HT}$=0.04 mN*m.

Due to the split-design coil ends fixing absence, the averaged longitudinal stresses ($\overline{\sigma}_z$) were assumed to be identically equal to zero, which corresponds to the results of measurements for which the averaged longitudinal stresses are within the measurement error limit.

The maximum hoop tensile stresses in the welded joint, calculated according to the formula (13), prior and followed by the heat treatment ($\sigma_{t,u\ wld}$ and $\sigma_{t,u\ HT}$, respectively) are equal to:

$\sigma_{t,s}{}^{wld}$=615 MPa and $\sigma_{t,s}{}^{HT}$=5 MP.

The maximum longitudinal stresses in the welded joint, calculated according to the formula (14), prior and followed by the heat treatment ($\sigma_{z,s}{}^{wld}$ and $\sigma_{z,s}{}^{HT}$, respectively) are equal to:

$\sigma_{z,s}{}^{wld}$=3 MPa and $\sigma_{z,s}{}^{HT}$=1 MPa

Example 2. Calculation of the maximum residual welding stresses in the welded joint of a split-design coil made of pipe billets DN850x70 (10GN2MFA steel), for which preliminary studies of the acoustic features of the metal were performed.

According to the results of studies on base metal of the welded components representative specimens define that the values of the intrinsic acoustic anisotropy are in the range of 0.0001±0.0003, that is, the base metal of the coil is acoustically isotropic. The initial value of the intrinsic acoustic anisotropy is assumed to be:

$a_0=0.0001$.

Figure 4:
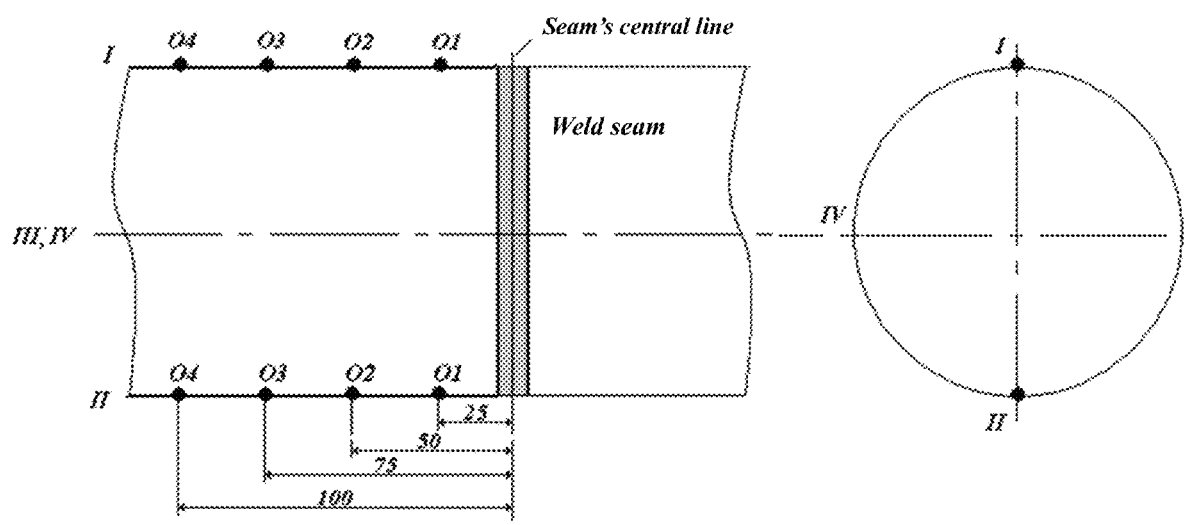
FIG. 4 shows the layout of the measurement points in sections.

To clarify the position of the measurement sections, additional measurements of acoustic anisotropy were performed after the welded joint completion at points located along the pipeline generators (see FIG. 4, where the layout of the location of the measurement points (O1-4) on the generating lines I and II of a pipeline is shown).

Based on the measurement results, it was found that the minimum values of the intrinsic acoustic anisotropy correspond to O2 points located at a distance of 50 mm from the weld line, which corresponds to the results of the computational modeling.

Thus, the position of the cross sections of measurements 1A and 1B and the value of the balancing coefficient are taken similarly to Example 1. The location of the stress measurement points is also similar to Example 1. Since, due to the split-design coil ends fixing absence, the averaged longitudinal stresses ($\overline{\sigma}_z$) were assumed to be identically equal to zero, measurements in section 2 intended for the calculation of $\overline{\sigma}_z$ were not performed.

The performance values ($t_1$, $t_2$, $t_3$) were defined twice: prior and followed by the heat treatment. The results of calculation the values of acoustic anisotropy (averaged over the measurement cross-sections) at the measurement points prior and followed by the heat treatment are shown on FIGS. 5 and 6.

Based on the results of acoustic anisotropy measurement, the following values were calculated:
according to the formula (10) the averaged values of hoop stresses in the measurement cross sections prior and followed by the heat treatment ($\overline{\sigma}_{t,wld}$ and $\overline{\sigma}_{t,HT}$, respectively):

$\overline{\sigma}_{t,wld}=-199$ MPa; $\overline{\sigma}_{t,HT}=-6$ MPa according to the formulas (11-12), the values of the bending moment in the weld section prior and followed by the heat treatment ($M_{wld}$ and $M_{HT}$, respectively):

$M_{wld}=0.11$ mN*m; $M_{HT}=0.09$ mN*m.

The maximum hoop tensile stresses in the welded joint, calculated according to the formula (13), prior and followed by the heat treatment ($\sigma_{t,u\ wld}$ and $\sigma_{t,u\ HT}$, respectively) are equal to:

$\sigma_{t,u\ wld}=646$ MPa and $\sigma_{t,u\ HT}=20$ MPa

The maximum longitudinal stresses in the welded joint, calculated according to the formula (14), prior and followed by the heat treatment ($\sigma_{z,s}{}^{wld}$ and $\sigma_{z,s}{}^{HT}$, respectively) are equal to:

$\sigma_{t,s}{}^{wld}=2.4$ MPa and $\sigma_{t,s}{}^{HT}=1.9$ MPa

REFERENCES

1. Balalov V. V., Moshensky V. G., Odintsev I. N., Pisarev V. S. "The Study of Residual Stresses in Welded Pipes Based on the Method of Drilling Holes and Optical Interference Measurements." "Industrial Laboratory. Diagnostics of Materials", 2011, v. 77, No. 5, pp. 43-49.
2. Russian Patent No. 2598980 for the invention "Ultrasonic method for determination of residual stresses in welded joints of pipelines".
3. Antonov A. A., Letunovsky A. P. Possibilities for evaluating residual stresses in welded structures. "NDT World", 2018, v. 21, No. 1, pp. 10-12.
4. GOST R 52890-2007. "Non-destructive testing. Evaluation of stresses in material of pipelines by ultrasound. General requirements".
5. "Components of NPP Equipment. Methodology for Measurement of Mechanical Stresses Produced by Technological Impacts with Application of Acoustic Elasticity Method". The Certificate of Attestation of measurements procedure No. 633/1700 dated 10 Jun. 2009. Registered in the Federal Register of Measurement Procedures under the number FR.1.28.2009.06227.
6. Kamyshev A. V., Makarov S. V., Pasmanik L. A., Smirnov V. A., Modestov V. S., Pivkov A. V. Generalized Coefficients for Measuring Mechanical Stresses by Acoustic Elasticity in Structures Made of Carbon and Low-Alloy Steels/Non-destructive testing. 2017. No. 1. Pp. 3-10.
7. Kamyshev A. V., Pasmanik L. A., Smirnov V. A., Modestov V. S., Pivkov A. V. "Computational and Instrumental Procedure for Evaluating the Stress-Strain State with the Determination of Force Boundary Conditions by the Acoustic Elasticity Method and its Application for Failure Analysis". CC No. 111. "Heavy Engineering", 2016, No. 1-2, pp. 11-18.

The invention claimed is:

1. A method of determining residual stresses of pipeline joints made of the acoustically isotropic metal, the method comprising:
    measuring, via ultrasonic echo, a first set of propagation times for longitudinal waves and transverse waves across an axis of a pipeline, wherein the first set of propagation times comprise $t_1$;
    welding one or more joints on the pipeline;
    determining, based on a type of pipeline material, a balancing coefficient (k), an elastic-acoustic coefficient (D), and intrinsic acoustic anisotropy ($a_0$);
    calculating separation of longitudinal membrane stresses ($\sigma_z$) and hoop membrane stresses ($\sigma_t$) according to equation 1:

$$\sigma_z - \sigma_t = D\left(2\frac{t_2 - t_1}{t_2 + t_1} - a_0\right)$$

calculating, based on the calculated $\sigma_t$ and $\sigma_z$, bending moments (M), maximum longitudinal stresses ($\sigma_{z,s}$), and maximum hoop stresses ($\sigma_{t,s}$); and
    determining the residual stresses of pipeline joints based on $\sigma_t$, $\sigma_z$, M, $\sigma_{z,s}$, and $\sigma_{t,s}$.

* * * * *